United States Patent [19]
Ferdows

[11] Patent Number: 5,285,654
[45] Date of Patent: Feb. 15, 1994

[54] EVAPORATIVE COOLING/HEATING SYSTEM WITH ROOF-MOUNTED WATER TANK

[75] Inventor: Houshang Ferdows, Boulder, Colo.

[73] Assignee: Suetrak Air Conditioning Sales Corporation, Commerce City, Colo.

[21] Appl. No.: 972,599

[22] Filed: Nov. 6, 1992

[51] Int. Cl.⁵ .............................................. F25D 17/04
[52] U.S. Cl. .................................... 62/309; 62/304; 62/310; 261/DIG. 4; 261/103
[58] Field of Search ................ 62/304, 305, 309, 310, 62/314; 261/DIG. 3, DIG. 4, DIG. 46, 36.1, 106, 103; 454/105

[56] References Cited

U.S. PATENT DOCUMENTS

| | | | |
|---|---|---|---|
| 3,472,147 | 10/1969 | Grasseler | 3/2 |
| 3,606,982 | 9/1971 | Anderson | 261/29 |
| 4,094,935 | 6/1978 | Walker et al. | 261/80 |
| 4,672,818 | 6/1987 | Roth | 62/239 |
| 4,835,982 | 6/1989 | Ferdows | 62/310 |
| 5,112,535 | 5/1992 | Robertson | 261/DIG. 4 |

Primary Examiner—John M. Sollecito
Attorney, Agent, or Firm—John E. Reilly

[57] ABSTRACT

An evaporative cooling system for mounting on the roof of a vehicle in which the sole source of water supply for the evaporative media in the system is contained in a low-profile housing mounted above the roof line of the vehicle.

20 Claims, 2 Drawing Sheets

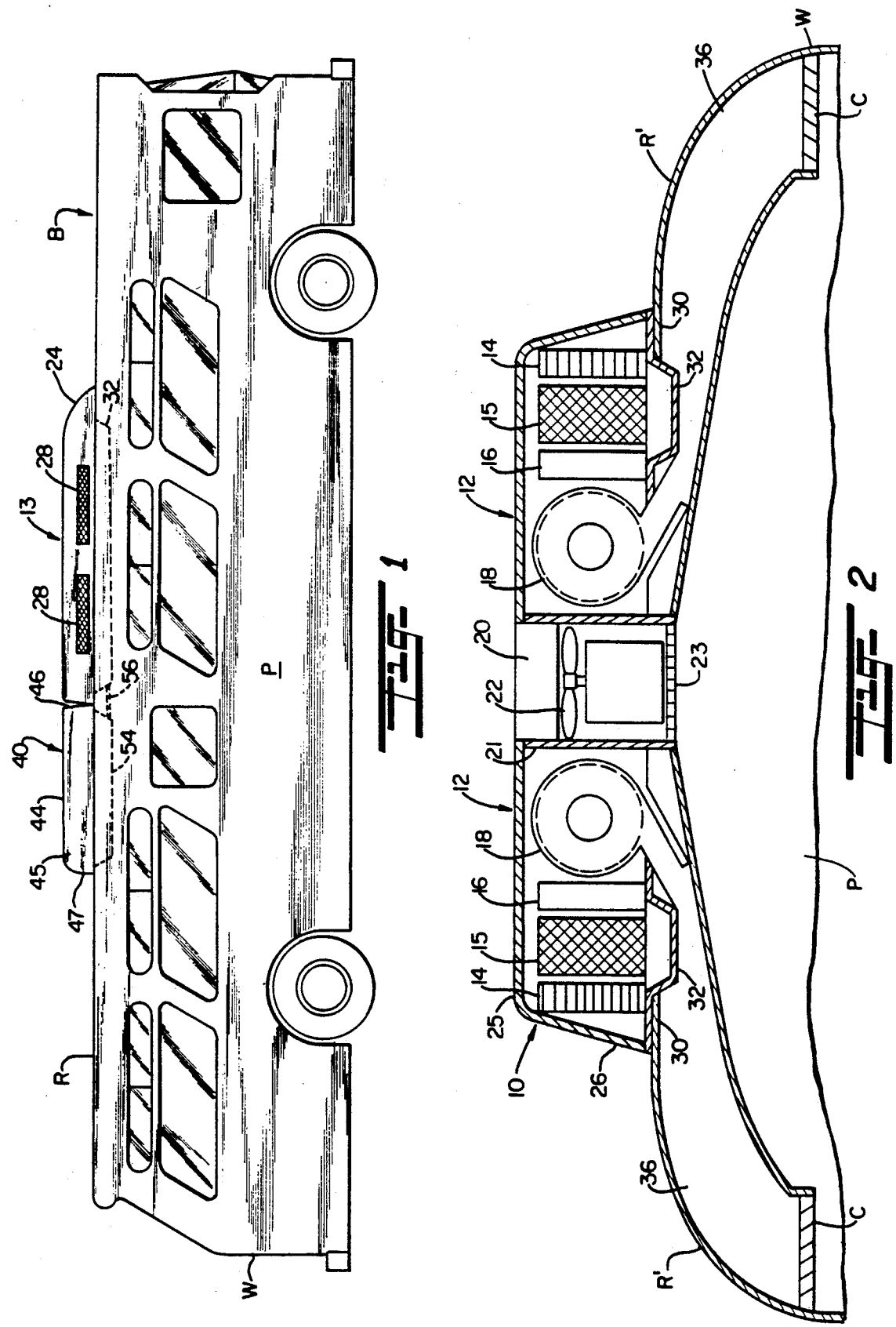

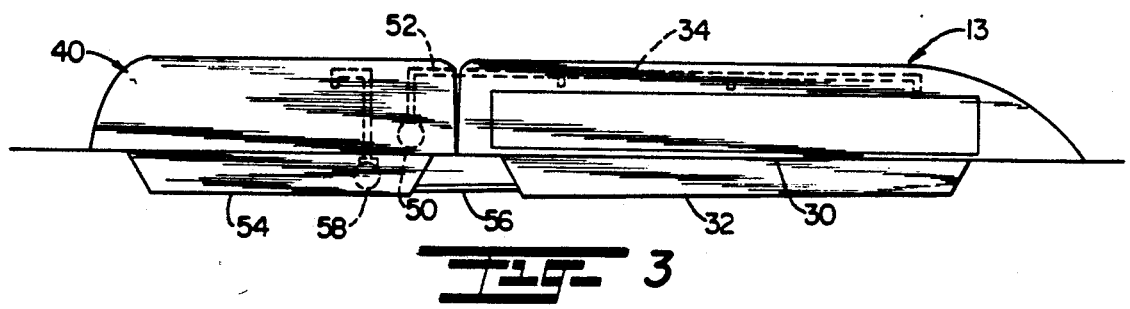
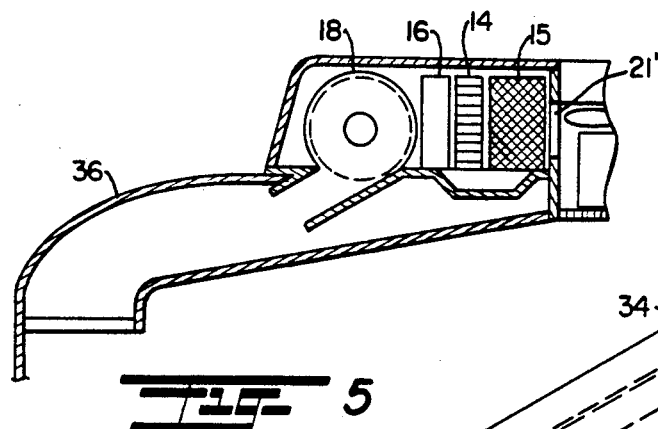
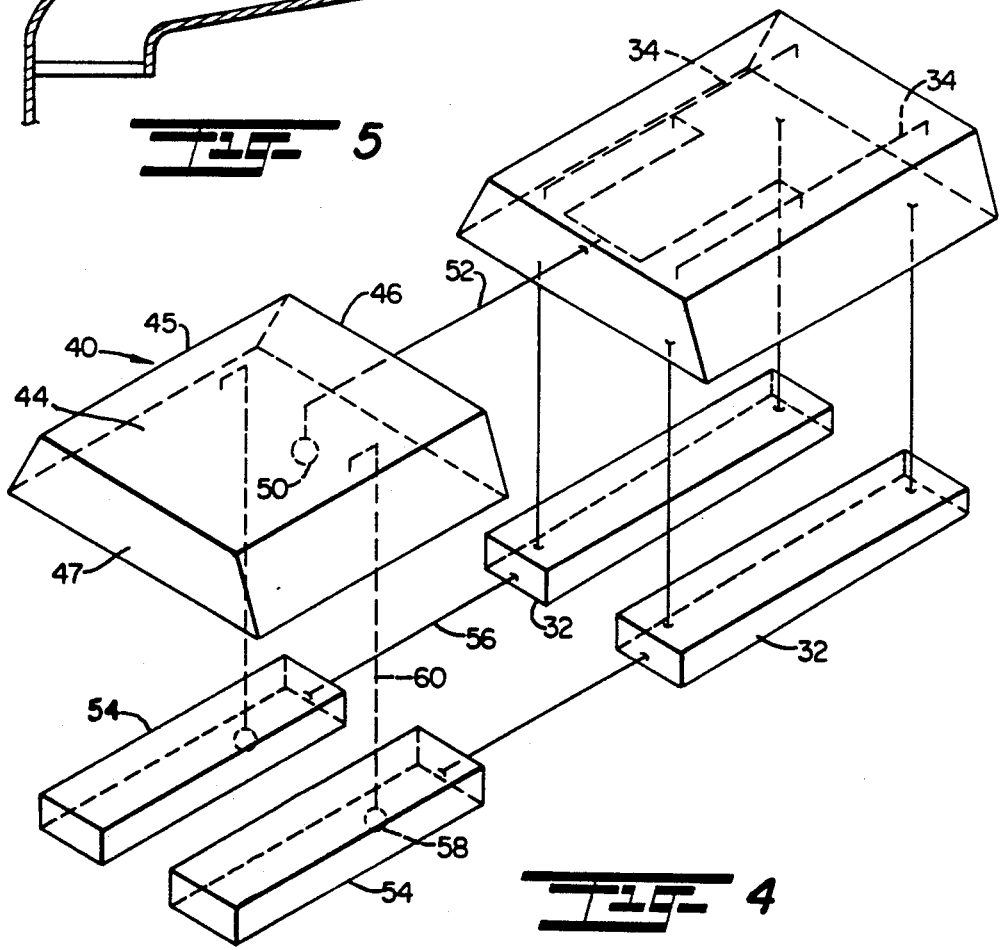

EVAPORATIVE COOLING/HEATING SYSTEM WITH ROOF-MOUNTED WATER TANK

This invention relates to air conditioning units; and more particularly relates to a novel and improved roof-mounted, low profile evaporative cooling and/or heating system for larger vehicles including but not limited to passenger busses, trains and recreational vehicles.

BACKGROUND AND FIELD OF THE INVENTION

Evaporative cooling systems are becoming increasingly popular for use in conditioning air in larger vehicles, such as, passenger busses. Among other reasons, such systems are less expensive to operate and avoid the use of refrigerant and particularly those which are known or at least suspected to release harmful pollutants into the atmosphere. A problem associated with the use of evaporative cooling systems is their space requirements. For example, in my prior U.S. Pat. No. 4,835,982 for Evaporative Cooling System owned by the assignee of this patent application there is set forth and described a system which can be roof-mounted on a passenger bus but which nevertheless requires a large storage reservoir for water. In the past, by virtue of the storage capacity required, it was necessary to place the reservoir within a lower storage compartment or area beneath the passenger section of the bus and to run connecting lines for plumbing between the evaporative cooling section and the reservoir. U.S. Pat. No. 3,472,147 to Grasseler discloses an air processing system in which a water storage reservoir is mounted directly beneath the roof line of a vehicle cab to supply water for air cooling purposes. In many of the smaller commercial vehicles, extremely large storage tanks are not required and it is therefore proposed in accordance with the present invention to provide a system in which the storage reservoir can be roof-mounted together with the evaporative system itself thereby greatly minimizing the space occupied by the evaporative cooling system as well as avoiding the time and cost of installation of delivery and return lines between the reservoir and evaporator sections itself.

Other representative patents and publications in the field of interest are those to U.S. Pat. Nos 3,606,982 to Anderson, 4,094,935 to Walker et al and 4,672,818 to Roth. None, however, suggests or discloses a water storage reservoir which can be mounted above the roof line of a vehicle.

SUMMARY OF THE INVENTION

It is therefore an object to provide for a novel and improved and improved evaporative cooling system and which is specifically adaptable for use in commercial vehicles.

Another object of the present invention is to provide for a novel and improved evaporative cooling system for vehicles which will occupy a minimum amount of space and is designed such that the entire system including the water supply can be roof-mounted.

It is another object of the present invention to provide in an evaporative cooling system for a water storage reservoir which is mounted in a low-profile housing or water tank above the roof line of a vehicle.

In accordance with the present invention, there has been devised in an evaporative cooling system for mounting on the roof of a vehicle wherein a first housing is provided with blowers to draw air through evaporative media in the housing and which media includes a filter block saturated with water for the purpose of cooling the air as a preliminary to delivery of the air into the interior of the vehicle, the improvement comprising water supply means in the form of a water tank mounted on the roof of the housing to serve as the sole source of water supply to the evaporative media, and water delivery and return means for delivering and returning water between the evaporative media and tank. Preferably, the tank is of low-profile, elongated configuration and is mounted in tandem to the first housing, and the first housing and water tank are of substantially corresponding width and height when mounted above the roof line of the vehicle. Further, the water return means includes return troughs beneath the evaporative media and recovery troughs beneath the water supply tank which are in communication with one another to form a closed circulating system for delivery of water to and from the evaporative media and storage tank, respectively.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a side view in elevation of a preferred form of evaporative system mounted on a passenger bus;

FIG. 2 is a cross-sectional view through the evaporator section of the system shown in FIG. 1;

FIG. 3 is a side view of the evaporator system schematically illustrating the circulation and drainage system employed between the evaporator section and roof-mounted storage tank;

FIG. 4 is an exploded view schematically illustrating in more detail the circulation and drainage system employed in accordance with the present invention; and FIG. 5 is a cross-sectional view of a modified form of evaporator section in accordance with the present invention.

DETAILED DESCRIPTION OF THE PREFERRED EMBODIMENT

Referring in more detail to the drawings, there is illustrated in FIGS. 1 and 2 a preferred form of evaporative system 10 mounted on a roof R of a conventional passenger bus B. The bus B is illustrated to include the usual passenger section as represented at P, and the roof R has opposed roof portions R' sloping laterally and downwardly away from the center of the roof into opposite sidewalls W. In the preferred form, the evaporative system 10 is mounted on the roof in split sections 12 in juxtaposed relation to one another on the roof portions R', and each section has an evaporator coil 14, filter block 15, heater 16 and blower 18. The sections 12 are separated by a common or central return air chamber 20 having side walls 21, and one or more fans 22 draw air from the interior passenger section P through a grille 23 and discharge upwardly through the open center between the sections 12.

The sections 12 are enclosed in a common housing 13 of low profile, elongated configuration having a front wall 24, top wall 25 which extends laterally and merges into a downwardly and outwardly sloping sidewall 26, and a rear wall 27. Each sidewall 26 has suitable air intake grilles 28. A bottom wall 30 of each housing includes an open channel or trough 32 extending lengthwise beneath the filter block 15 to collect any excess water from the block 15. In this relation, a distribution pipe 34 extends above and along the entire length of each filter block 15 and has spaced outlets to disperse water evenly along the upper surface of the filter block 15. Each of the filter blocks is composed of an absorbent material, such as, a cellulose or paper material impregnated with anti-rot salts and rigidifying saturants and is of a porous, sponge-like composition. In this way, water passing downwardly through the block will become evenly distributed and at the same time permit the passage of air from the intake grilles 28 horizontally through the filter block into the intake of the blower 18. Each of the blowers 18 will draw air into the grilles 28, across the evaporator coil 14, filter 15 and heater 16 to pass downwardly from the blower through angular ducts 36 beneath the housing 12 into a plenum chamber C along the inside of the passenger section P.

Referring to FIGS. 3 and 4, an important feature of the present invention resides in the disposition of a water circulating tank 40 on the roof R and in tandem with the housing 13. The tank 40 is of low profile and of elongated configuration having a top wall 44 in a common generally horizontal plane with the top wall 25 of the housing 12, inclined sidewalls 45 and front and rear end walls 46 and 47, the tank 40 being of a width corresponding to that of the housing 12 for the system proper. The tank 40 is hermetically sealed and securely anchored to the roof by suitable means and has a pump 50 with a water supply line 52 extending from the tank 40 through the front end wall 46 and the rear end wall 27 of the housing 12 for connection to the distribution pipes 34 as best seen from FIG. 4.

A pair of water recovery troughs 54 are aligned in tandem with the troughs 32, each being connected by a drain line 56 to one of the troughs 32 to permit excess water to flow by gravity from the troughs 32 into the troughs 54. The troughs 54 are preferably inset into the roof in a manner similar to that of the troughs 32 so as to be disposed beneath the roof line but isolated from the upper circulating tank 40. A sump pump 58 is disposed in each of the troughs 54 and has a discharge line 60 extending upwardly into the tank 40. A float valve 62 senses the water level in the tank and activates the sump pumps to deliver water into the tank from the troughs 54 when the water in the tank 40 drops below a predetermined level.

A modified form of evaporator section is illustrated in FIG. 5 for use with the novel and improved system of the present invention and specifically wherein the location of the coils 14 and filter blocks 15 are reversed or interchanged with respect to the blowers 18. In this way, the blowers 18 are located outside of the coils 14 and filter blocks 15 and can draw air both from the outside and from the return air chamber 20 through the heater sections 16, filter blocks 15 and coils 14, respectively, and facilitates more convenient and direct connection of the blowers 18 into the ducts 36. In order to regulate the relative amount of return air to outside air, control dampers 21' are provided in the sidewalls 21 of the chamber 20.

It is therefore to be understood that the foregoing and other modifications and changes may be made in the construction and arrangement of elements comprising the preferred form of invention as herein set forth and described without departing from the spirit and scope thereof as defined by the appended claims.

I claim:

1. In an evaporative cooling system adapted to be mounted on a roof of a vehicle wherein a first housing is provided with blowers to draw air from the outside of the housing through evaporative media in the housing, said media including a filter block saturated with water for the purpose of conditioning the air as a preliminary to delivery of the air into the interior of said vehicle, the improvement comprising:

water supply means for said evaporative media including a water tank mounted on said roof of said housing in tandem with said first housing to serve as the sole source of water supply to said evaporative media;

water delivery means for delivering water from said tank to said evaporative media; and water return means for collecting and returning excess water from said evaporative media to said tank.

2. In an evaporative cooling system according to claim 1, said water tank being of low profile elongated configuration.

3. In an evaporative cooling system according to claim 2, said first housing and said water tank being of substantially corresponding width and height when mounted on said roof of said housing.

4. In an evaporative cooling system according to claim 1, said water return means including a trough disposed beneath said evaporative media in said first housing.

5. In an evaporative cooling system according to claim 4, including a drain between said trough and said water supply tank.

6. In an evaporative cooling system according to claim 1, said first housing including a pair of juxtaposed housing sections extending longitudinally of said roof and having said evaporative media and blowers in each of said housing sections.

7. In an evaporative cooling system according to claim 6, including return air means disposed between said housing sections to discharge air from the interior of said vehicle outwardly through said roof.

8. In an evaporative cooling system according to claim 6, said water return means including a pair of return troughs disposed beneath said evaporative media in each of said housing portions, juxtaposed recovery troughs disposed beneath said water supply tank and aligned in substantially end-to-end relation to said return troughs, and a drain line extending between each of said return troughs and said recovery troughs.

9. In an evaporative cooling system according to claim 8, said water delivery means including a pump member in said water supply tank and water distribution pipes in overhead relation to said evaporative media.

10. In an evaporative cooling system according to claim 8, including a pump member in each of said recovery troughs for pumping excess water from said recovery troughs into said water supply tank.

11. In an evaporative cooling system adapted to be mounted on a roof of a vehicle wherein a first housing is provided with blowers to draw air from outside of the housing through evaporative media in the housing, said media including a filter block saturated with water for the purpose of cooling the air for delivery of the air into the interior of said vehicle, the improvement comprising:

water supply means for said evaporative media including a water storage tank mounted on said roof of said housing to serve as the sole source of supply of water to said evaporative media, said water tank being of low profile elongated configuration and mounted in tandem to said first housing;

water delivery lines for delivering water from said tank to said evaporative media; and water return means for collecting and returning excess water from said evaporative media to said tank, said water return means including a pair of troughs disposed beneath said evaporative media, juxtaposed recovery troughs disposed beneath said water supply tank and aligned in substantially end-to-end relation to said return troughs, and a drain line extending between each of said troughs and said recovery troughs.

12. In an evaporative cooling system according to claim 11, said first housing and said water tank being of substantially corresponding width and height when mounted on said roof of said housing.

13. In an evaporative cooling system according to claim 11, including a drain between said trough and said water storage tank.

14. In an evaporative cooling system according to claim 11, said first housing including a pair of juxtaposed housing sections extending longitudinally of said roof and having evaporative media and blowers in each of said housing sections.

15. In an evaporative cooling system according to claim 14, including return air means disposed between said housing sections to discharge air from the interior of said vehicle outwardly through said roof.

16. In an evaporative cooling system according to claim 11, said water delivery means including a pump member in said water storage tank and water distribution pipes in overhead relation to said evaporative media.

17. In an evaporative cooling system according to claim 11, including a pump member in each of said recovery troughs for pumping excess water from said recovery troughs into said water storage tank.

18. In an evaporative cooling system adapted to be mounted on a roof of a vehicle wherein a first housing is provided with blowers to draw air from outside of the housing through evaporative media in the housing, said media including a filter block saturated with water for the purpose of conditioning the air as a preliminary to delivery of the air into the interior of said vehicle, the improvement comprising:

water supply means for said evaporative media including a water tank mounted on said roof of said housing to serve as the sole source of water supply to said evaporative media;

water delivery means for delivering water from said tank to said evaporative media;

water return means for collecting and returning excess water from said evaporative media to said tank; and said first housing including a pair of juxtaposed housing sections extending longitudinally of said roof and having a central return air chamber communicating with the interior of said vehicle and located intermediately between said juxtaposed housing sections.

19. In an evaporative cooling system according to claim 18, each of said juxtaposed housings including outside air intake means in communication with said blowers and damper control means in said return air chamber to regulate the relative amount of return air to outside air drawn through said housing sections by said blowers.

20. In an evaporative cooling system according to claim 19, each of said housing sections including heater coils between said return air chamber and said blower.

* * * * *